Sept. 16, 1958  W. R. POLANIN  2,852,102
CLASP BRAKE ARRANGEMENT
Filed Dec. 30, 1953
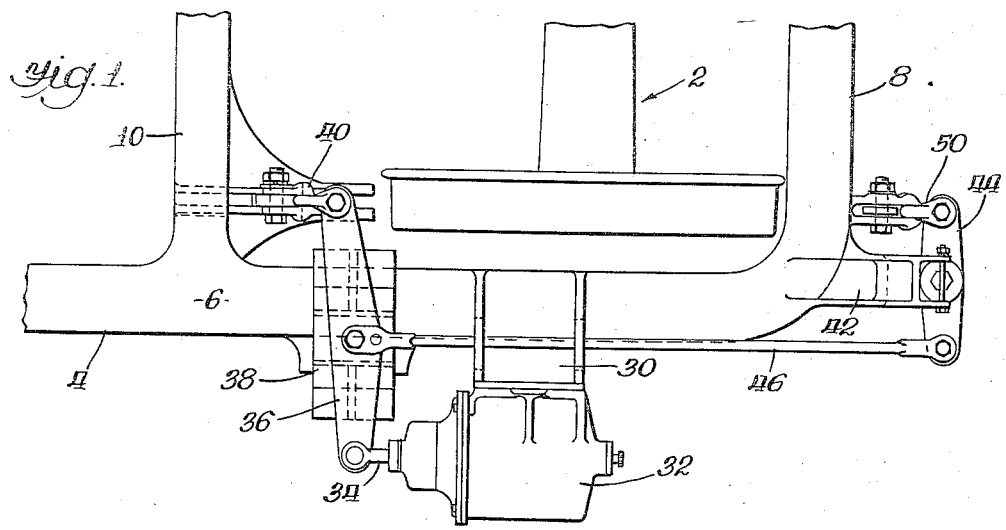
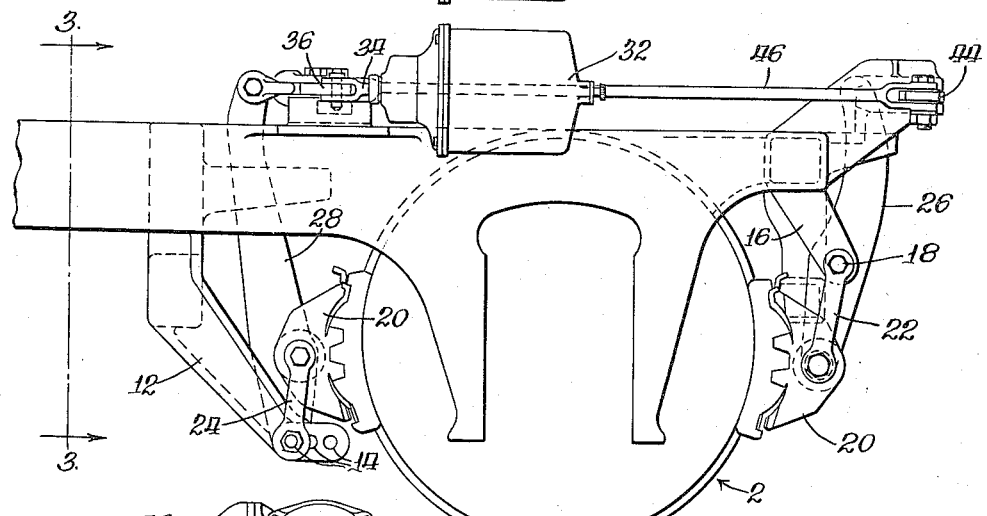
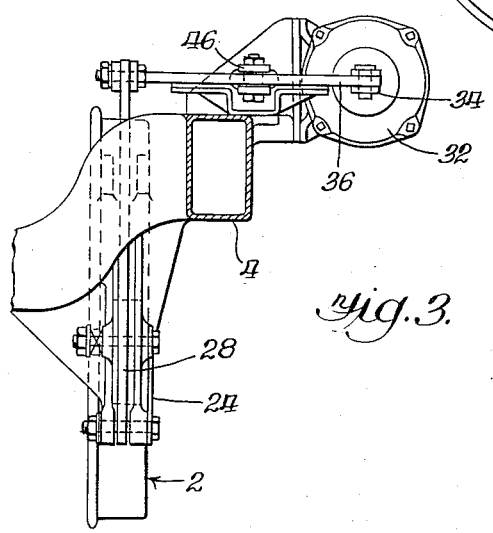
INVENTOR.
Walter R. Polanin
BY
O. D. Farmer
Atty.

United States Patent Office 2,852,102
Patented Sept. 16, 1958

2,852,102

CLASP BRAKE ARRANGEMENT

Walter R. Polanin, Chicago, Ill., assignor to American Steel Foundries, Chicago, Ill., a corporation of New Jersey Application December 30, 1953, Serial No. 401,223

2 Claims. (Cl. 188—56)

The invention relates to brake rigging for railway rolling stock and particularly to that type of brake rigging known in the art as a clasp brake.

It is a general object of the invention to provide a railway car truck with an independent clasp brake arrangement for each wheel.

It is a more specific object of the invention to provide a novel fulcruming arrangement for the respective brake levers.

It is an additional object of the invention to provide said clasp brake arrangement with positive acting frame fulcrumed brake levers for the respective brake shoe assemblies.

More particularly, it is an object of the invention to provide a fulcruming arrangement wherein one of the brake levers is fulcrumed above the axis of rotation of the related wheel and the other brake lever is fulcrumed below said axis of rotation of the related wheel.

The design further contemplates the fulcruming of the inboard brake lever below said axis of rotation of the related wheel whereby additional space is afforded above the central portion of the frame where needed for other equipment installation.

These and other objects of the invention will become apparent from an examination of the following specification and the accompanying drawings, wherein:

Figure 1 is a fragmentary top plan view of a railway car truck embodying the invention, only one-quarter of the truck being illustrated inasmuch as the structure shown is duplicated in the other quadrants thereof, Figure 2 is a fragmentary side elevational view of the structure shown in Figure 1, and Figure 3 is a sectional view taken along line 3—3 of Figure 2.

Describing the invention in detail, the railway car truck comprises a wheel and axle assembly indicated generally at 2, said assembly supporting in the conventional manner (not shown) a frame 4. The frame 4 comprises a side rail 6, a transverse end rail 8, and transom member 10, arranged in perpendicular relation to the side rail 6.

A bracket 12 is formed on the transom member 10 and arranged to depend downwardly and angularly toward the related wheel of the wheel and axle assembly 2. The bracket 12 is preferably formed integrally with the transom member 10 so as to be considered part of the frame. At the lower end thereof the bracket 12 offers a plurality of pivot holes 14, the purpose of which will be hereinafter described. The end rail 8 of the frame 4 also offers a bracket 16 depending therefrom and in longitudinal alignment with the plane of rotation of the wheel. The bracket 16 is provided at the lower end thereof with a pivot hole 18.

Brake head-brake shoe assemblies 20 are arranged on opposite sides of the wheel in such a manner as to clasp and be engageable with the tread thereof. The outboard or right-hand brake shoe assembly 20 is pivotally connected to a hanger or member 22, which in turn pivotally connects said assembly to the bracket 16. Inboardly of the truck another member 24 pivotally connects the related brake shoe assembly 20 to the bracket 12 of the transom member 10.

Dead brake levers 26 and 28 are provided on opposite sides of the wheel, said brake lever 26 being fulcrumed to the bracket 16 intermediate the ends thereof as at 18. The brake lever 28 is fulcrumed at the lower end thereof to the bracket 12 as at 14. The lower end of the brake lever 26 is pivotally connected to the related brake shoe assembly 20, while an intermediate portion of the brake lever 28 is pivotally connected to the related brake shoe assembly 20. It will be noted that the axes of pivot of the connection between the respective brake levers 26 and 28 and the shoe assemblies 20 are approximately horizontally aligned with the axis of rotation of the clasped wheel.

A bracket 30 is provided on the side rail 6 of the frame 4 whereby a power cylinder 32 may be conveniently attached. The power cylinder 32 includes a piston rod 34 extending from one side thereof, said piston rod being horizontally movable longitudinally of the truck. Brake actuating linkage or rigging operatively connects the piston rod 34 of the power cylinder 32 to the brake levers 26 and 28, said rigging comprising a live cylinder or actuating lever 36 frame supported by the bracket 38 and having its outboard end connected to the piston rod 34. The inboard end of the live actuating lever 36 is clevis or link connected as at 40 to the upper end of the brake lever 28. The frame 4 is additionally provided with a bracket 42 which pivotally mounts for horizontal movement a dead actuating lever 44. A pull rod 46 interconnects the outboard end of the dead actuating lever 44 with a mid-portion of the live actuating lever 36. The inboard end of the dead actuating lever 44 is clevis or link connected as at 50 to the upper end of the dead brake lever 26.

In operation of the brake rigging illustrated and upon actuation of the power cylinder 32, the piston rod 34 is urged horizontally to the left, said horizontal movement including a clockwise rotation of the live actuating lever 36 which in turn carries the pull rod 46 to the left. Movement of the pull rod 46 to the left causes a clockwise rotation of the dead actuating lever 44 which in turn causes a clockwise rotation (as seen in Figure 2) of the brake lever 26 about its pivot 18 whereby the carried brake shoe assembly is urged to engage the related side of the wheel. Additionally, the clockwise rotation of the live actuating lever 36 causes a clockwise rotative movement of the brake lever 28 about its pivot 14 which again moves the carried brake shoe assembly 20 into engagement with the associated side of the wheel. On the de-actuation of the cylinder 32 the brake releases the various parts moving in a direction opposite to that described above.

It will be noted that the brake lever 26 fulcrums the carried brake shoe assembly into engagement with the related wheel about a point 18 above the axis of rotation of the engaged wheel, while the brake lever 28 fulcrums the carried brake shoe assembly 20 into engagement with the related wheel about a point 14 below the axis of rotation of the related wheel.

I claim:

1. In a clasp brake linkage arrangement for a railway car truck comprising a frame and a supporting wheel and axle assembly, the combination of: a power cylinder mounted on the outboard side of the frame adjacent said assembly; friction means disposed on opposite sides of said assembly for engagement therewith; a pair of generally vertically extending dead brake levers disposed on opposite sides of said assembly, one of said levers being fulcrumed intermediate its ends to the frame at a point located above the rotational axis of said assembly and being pivotally connected at its lower end to one of said friction means, the other of said levers being fulcrumed at its lower end to the frame at a point located below the rotational axis of said assembly and being pivotally connected intermediate its ends to the other of said friction means; a pair of generally horizontally extending actuating levers connected at their inboard ends to the upper ends of the respective brake levers, one of said actuating levers being a dead lever fulcrumed to the frame, the other of said actuating levers being a live lever connected to the power cylinder; and a generally horizontally extending rod interconnecting said actuating levers.

2. A clasp brake linkage arrangement according to claim 1, wherein the dead actuating lever is fulcrumed intermediate its ends to the frame, wherein the live actuating lever is connected at its outboard end to the power cylinder, and wherein said connecting rod has one end connected to the outboard end of the dead actuating lever and the other end connected to the live actuating lever intermediate the ends of said lever.

References Cited in the file of this patent

UNITED STATES PATENTS

| | | |
|---|---|---|
| 2,237,509 | Tack | Apr. 8, 1941 |
| 2,343,939 | Tack | Mar. 14, 1944 |
| 2,343,941 | Tack | Mar. 14, 1944 |
| 2,716,468 | Simanek | Aug. 30, 1955 |